United States Patent [19]
Johnson

[11] Patent Number: 4,508,437
[45] Date of Patent: Apr. 2, 1985

[54] METHOD AND APPARATUS FOR EXPOSING AND VIEWING AT SAME STATION

[75] Inventor: Bruce K. Johnson, Andover, Mass.

[73] Assignee: Polaroid Corporation, Cambridge, Mass.

[21] Appl. No.: 519,085

[22] Filed: Aug. 1, 1983

[51] Int. Cl.[3] .................................... G03B 17/52
[52] U.S. Cl. .................................... 354/78; 354/86; 354/181; 354/225
[58] Field of Search ............... 354/77, 78, 83, 84, 354/85, 86, 76, 154, 155, 181, 212, 219, 224, 225

[56] References Cited

U.S. PATENT DOCUMENTS

| | | | |
|---|---|---|---|
| 2,819,662 | 1/1958 | Land | 354/86 |
| 2,854,903 | 10/1958 | Land et al. | 95/12.21 |
| 3,255,670 | 6/1966 | Lasermann | 90/62 |
| 3,350,990 | 11/1967 | Finelli et al. | 95/13 |
| 3,369,469 | 2/1968 | Downey | 95/13 |
| 3,369,470 | 2/1968 | Downey | 95/13 |
| 3,421,423 | 1/1969 | Downey et al. | 95/13 |
| 3,437,023 | 4/1969 | Downey et al. | 95/13 |
| 3,437,024 | 4/1969 | Downey et al. | 95/13 |
| 3,446,127 | 5/1969 | Silverman et al. | 95/12 |
| 3,446,131 | 5/1969 | Cook et al. | 95/13 |
| 3,455,222 | 7/1969 | Downey et al. | 95/13 |
| 3,525,293 | 8/1970 | Harvey | 95/13 |
| 3,537,370 | 11/1970 | Wareham | 95/13 |
| 3,541,937 | 11/1970 | Nerwin | 95/13 |
| 3,541,938 | 11/1970 | Harvey | 95/13 |
| 3,541,939 | 11/1970 | Kamp | 95/30 |
| 3,541,940 | 11/1970 | Bartnick et al. | 95/30 |
| 3,575,081 | 4/1971 | Nerwin | 88/1.5 |
| 3,614,920 | 10/1971 | Kamp | 95/13 |
| 3,636,844 | 1/1972 | Kamp | 95/13 |
| 3,648,527 | 3/1972 | Kamp | 74/17.5 |
| 3,783,765 | 1/1974 | Uno et al. | 354/155 |
| 3,875,579 | 4/1975 | Mochizuki | 354/154 |
| 3,958,257 | 5/1976 | Johnson | 354/83 |
| 4,034,393 | 7/1977 | Goldmacher | 354/354 |
| 4,114,166 | 9/1978 | Driscoll et al. | 354/76 |
| 4,132,471 | 1/1979 | Svatek | 354/86 |
| 4,150,885 | 4/1979 | Breglia et al. | 354/78 |
| 4,265,525 | 5/1981 | Stella et al. | 354/76 |
| 4,311,377 | 1/1982 | Matteson | 354/217 |
| 4,324,469 | 4/1982 | Harvey | 354/214 |

OTHER PUBLICATIONS

U.S. Application Serial No. 490,316, Filed May 2, 1983, Inventor Johnson et al.

Primary Examiner—A. A. Mathews
Attorney, Agent, or Firm—Leslie J. Payne

[57] ABSTRACT

Method and photographic apparatus are disclosed for use in allowing exposing and viewing of image recording units of the self-developing type at the same station within the apparatus.

11 Claims, 4 Drawing Figures

METHOD AND APPARATUS FOR EXPOSING AND VIEWING AT SAME STATION

BACKGROUND OF THE INVENTION

This invention relates in general to the field of photography and, in particular, to compact self-developing cameras of the type used with self-developing film units.

Most miniature self-developing cameras found in the prior art are configured for exposing and processing so-called instant slides. Ordinarily, these positive image transparencies are premounted in a frame for facilitating their viewing or projection. For representative examples of the prior art relating to miniature self-developing cameras reference may be made to the following U.S. Pat. Nos.: 2,854,903; 3,255,670; 3,350,990; 3,369,469; 3,369,470; 3,421,423; 3,437,023; 3,437,024; 3,446,127; 3,446,131; 3,455,222; 3,541,939; 3,541,940; 3,541,937; 3,541,938; 3,575,081; 3,525,293; 3,614,920; 3,648,527; 3,636,844; 4,114,166; and 4,132,471.

To varying degrees the cameras described in the above-noted patents with the exception of the latter two require the photographer to manually handle the transparencies following processing in order to view them. Clearly, this is a disadvantage because the possibility exists that the slides will become damaged by the environment and/or fingerprints and the like. Moreover, by the very nature of the fact that these film units are of the small format type they require careful handling and storing.

In connection with U.S. Pat. Nos. 2,854,903; 3,255,670; 3,446,127; 3,446,131; and 3,575,081 all include integral or attachable magnifying slide viewers for facilitating viewing of the slide following exposure and processing. Even with such viewers the operator must manually handle the slide following processing. Obviously, this is time-consuming and, as noted above, requires care in handling to avoid damaging them.

Another area of concern with cameras of this type is that there is a requirement for a light excluding imbibition chamber. In such chamber the film unit is held for a short time following distribution of the fluid at the processing station. This prevents the film from becoming fogged. Clearly, the addition of an imbibition chamber in alignment with the pressure applying rollers at the processing station together with any film unit cassette creates the problem of increasing the camera size.

Commonly-assigned U.S. Pat. No. 2,819,662 discloses a camera wherein a film unit is manually inserted in the camera whereat it is exposed at an exposure station, manually withdrawn from the camera for imbibition purposes and manually returned to the same station for viewing purposes.

U.S. Pat. No. 4,114,166 discloses a self-developing camera requiring storage chambers for exposed and unexposed transparencies; respectively. While the slides can be viewed without touching them, there is required a viewing system external to the camera. Also, this arrangement requires the use of an imbibition chamber separate from the unexposed film storage chamber. Hence, such a system is not as compact and simple as might otherwise be desirable. U.S. Pat. No. 4,132,471 discloses a self-developing camera using small format positive transparencies wherein the viewing station is separate from the exposure station.

SUMMARY OF THE INVENTION

In accordance with the present invention, there is provided a photographic apparatus for use in automatically exposing film units having a photosensitive area at a focal plane and for allowing processed ones of these units to be viewed at the same focal plane.

Included in such apparatus is means for directing image forming light rays from a scene to be photographed to the focal plane as well as means for storing the film units both before and after exposure thereof. Processing means are provided for causing distribution of the processing fluid over the photosensitive area. There is provided optical means for permitting viewing of the scene images prior to exposure and for permitting viewing of processed film units at the focal plane following exposure. Handling means are provided which are operable in response to initiation of a cycle for selectively presenting the film unit at the focal plane so as to allow exposing and viewing at the same focal plane.

In an illustrated embodiment, the processing means distributes the processing fluid over the photosensitive area of the film prior to exposure of the film, while the film handling means selectively maintains the film unit at the focal plane so as to allow for processing, exposing and viewing at the same focal plane before returning the exposed unit to the storing means.

In another illustrated embodiment, there is provided means cooperable with the optical means which is operable for projecting artificial illumination at a processed and exposed film unit transparency located at the focal plane so as to project its images to a viewfinder lens. Also provided are means for blocking scene light from being transmitted from the taking lens to the viewfinder lens during viewing of the transparency. Means are also provided for blocking scene light from the viewfinder lens reaching the film unit during exposure.

Among the other objects of the present invention are, therefore, the provision of a photographic apparatus for use in automatically exposing film units at a focal plane and for allowing viewing of the processed units at the same focal plane; an apparatus of the above type wherein the film unit is of the self-developing type; an apparatus of the last-noted type which has processing fluid distributed over the unit prior to exposure for facilitating exposing and viewing of the unit at the same focal plane without movement of the film therefrom; the provision of an apparatus of the above type wherein an integral optical means facilitates through-the-lens viewing of the scene as well as viewing of the film units at the same focal plane following exposure; and, the provision of means operable for projecting artificial illumination at an exposed unit located at the focal plane for projecting images of the transparency to a viewfinder and for generally simultaneously blocking scene light from being transmitted to the viewfinder lens from the taking lens. The present invention also contemplates a method whereby the film unit may be processed prior to exposure so as to facilitate maintaining the film unit at the focal plane for viewing purposes without requiring the film unit to be moved from the focal plane following exposure.

Other objects and further scope of applicability of the present invention will become apparent from the detailed description to follow when taken in conjunction with the accompanying drawings in which like parts are designated by like reference numerals throughout.

DETAILED DESCRIPTION

Figure 1:
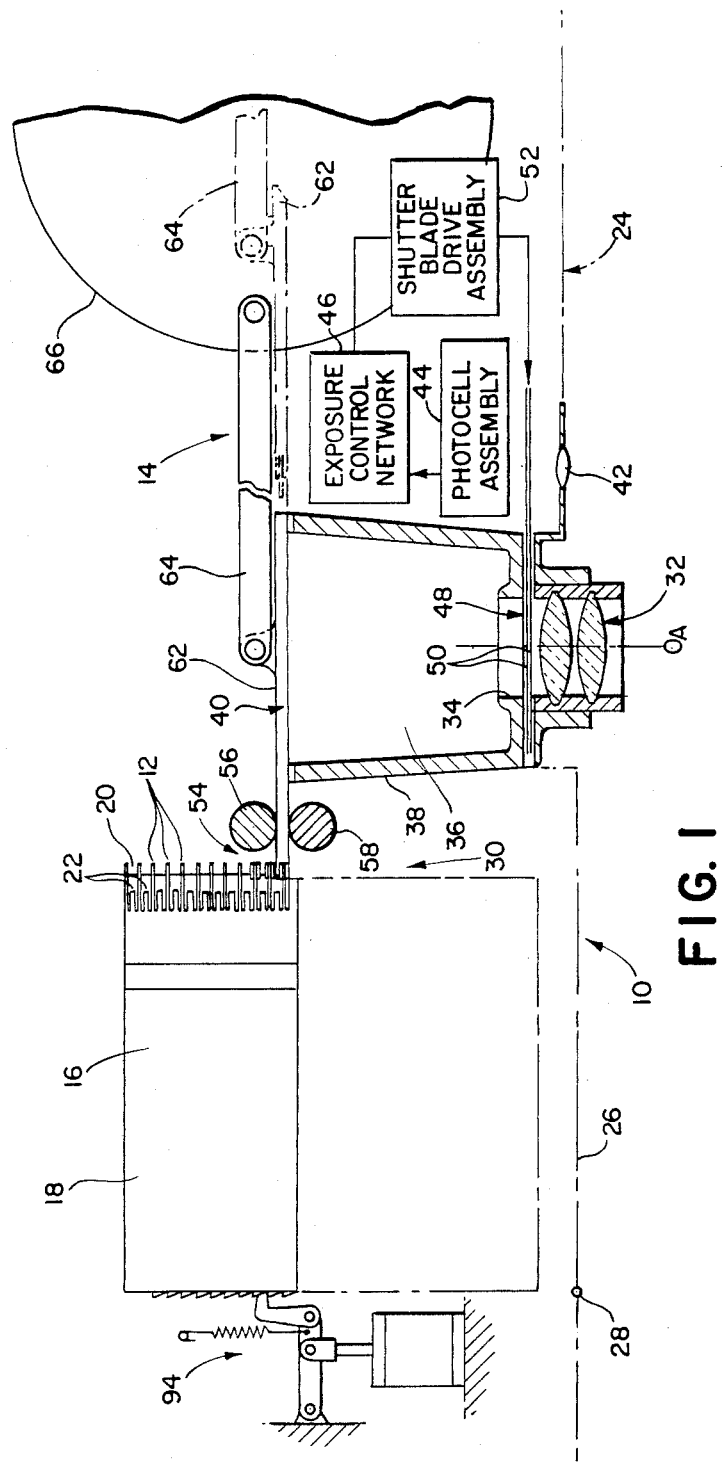
FIG. 1 is a schematic planar view showing certain components of a photographic apparatus made in accordance with the present invention.

Reference is now made to FIGS. 1-4 of the drawings for showing one embodiment of the present invention. As illustrated in diagrammatic form, there is provided a photographic camera apparatus 10, only a part of which has been shown. This photographic apparatus 10 is of the self-developing type for use with a plurality of self-developing image recording film units 12. In this embodiment, the film units 12 are of the type which when processed provide viewable positive transparencies (i.e., instant slides).

Each of the film units 12 is of a small format type such as disclosed in commonly-assigned, copending U.S. patent application Ser. No. 490,316. Such a unit includes a rectangular image receiving area 12a surrounded by a border 12b of relatively stiff paper. Formed in the border 12b adjacent the leading edge of the film unit is a rupturable pod (not shown) containing processing fluid. The film unit 12 is provided with a pair of notches 12c, each of which is sized and shaped to cooperate with a film handling mechanism 14 in a manner described more fully in the last-noted application. Formed intermediate the pod and the notches 12c is a pair of strips of opaque foam material 12d. One strip 12d is on each side of the film unit 12. The opaque foam strip 12d is of the type described in the last-noted application. Of course, the present invention contemplates that film units having formats other than the type illustrated are usable.

Usable with the photographic apparatus 10 is a film cassette 16 which includes a container 18 housing each of the film units 12. The container 18 stores the units 12 before and after the exposure and viewing modes. The film cassette 16 described does not form an aspect of the present invention; hence, a detailed description thereof is not believed necessary. However, for a more detailed description of such a film cassette, reference is made to the last-noted application.

For present purposes suffice it to say that the film container 18 includes an open end 20 and a plurality of spaced-apart wall members 22. The wall members 22 are light attenuating and cooperate with themselves as well as with the foam strips 12d and container to protect against light fogging of unexposed film units as well as provide an imbibing chamber. The container 18 is intended to be removable from the photographic camera for the reasons stated in the last-noted application. Although this embodiment discloses a single container for unexposed and exposed film, it is contemplated that a pair of storing arrangements for exposed and unexposed film units may be used.

Referring back to the photographic camera 10, it includes a camera body 24 having associated therewith a loading door 26 pivotally mounted for movement about a pivot axis 28. The door 26 is constructed and assembled to be movable between the depicted closed position and an open position (not shown). The film container 18 is adapted to be slidably received within an interior compartment 30 formed by the interior walls of the camera body 24. Access to the compartment 30 is gained by releasing a releasing latch button (not shown) formed on the front wall of the camera body 24.

Formed on the front vertical wall portion of the camera body 24 is an objective or taking lens system 32 having an optical axis $O_A$. This taking lens system 32 is arranged forwardly of an exposure opening 34 formed as an entrance to an exposure chamber 36. The latter is, in part, formed by a focal cone 38. Located in the exposure chamber 36 is a focal plane 40 at which the film units 12 are to be individually exposed and, if desired, viewed. Also formed is an aperture having a photocell window 42 mounted in registration with a photocell assembly 44. Such an assembly 44 is operatively connected to an exposure control network 46 for evaluating scene light intensity incident thereupon in a known manner. The exposure control network 46, in turn, controls a blade mechanism 48 for defining the exposure through a shutter blade drive assembly 52.

With respect to the blade mechanism 48 it is of the so-called scanning type. The construction and operation of such a blade mechanism 48 in conjunction with the noted exposure control network 46 for use in a single lens reflex camera is more fully described in commonly-assigned U.S. Pat. No. 3,958,257. Since the blade mechanism 48 does not form an aspect of the current invention, only a brief description thereof will be set forth for purposes of facilitating the description of the present embodiment.

As shown, the blade mechanism 48 is disposed intermediate the taking lens system 32 and the focal plane 40. Briefly, the blade mechanism 48 includes two overlapping shutter blades 50, each of which includes a primary scene light admitting aperture. These apertures coincide with each other for providing a progressively overlapping relationship with respect to the scene light exposure opening 34. This is done for defining a progressive variation of effective aperture values which is in accordance with the displacement of such blade elements. Although not shown, each of the shutter blades 50 includes a photocell or secondary sweep aperture which moves in correspondence with the primary apertures for progressively defining secondary aperture values as a function of blade positioning. These sweep apertures when coinciding with respect to the photocell assembly 44 effectively and automatically control the intensity of scene light evaluated by the exposure control network 46. Since this embodiment shows a single lens reflex type camera, the blades 50 are arranged such that their primary apertures are normally overlapping in an open orientation prior to exposure. Consequently, an operator is permitted to view and frame the scene to be photographed.

Responsive to commencement of a photographic cycle, effected, such as by depressing a suitable photographic cycle start button (not shown), the shutter blades 50 are moved to a closed orientation. This is carried out by a shutter drive assembly 52 which includes a solenoid (not shown). The solenoid cooperates with the shutter blades 50 through a walking beam assembly, also not shown. When energized, the solenoid causes retraction of a plunger which effects rapid rotation of the walking beam so as to move the blades into the fully closed orientation. After an appropriate time out delay, the camera system would deenergize the solenoid, thereby permitting a spring (not shown) to drive the shutter blades 50 towards their open orientation representing maximum aperture. Simultaneously, the photocell assembly 44 is operated for purposes of evaluating scene light. When the photocell assembly 44, in conjunction with the exposure control network 46, determines that an exposure interval should be terminated, the solenoid is energized for rapidly closing the shutter blades 50. Thus, an exposure is terminated as a function of the scene light incident upon the photocell assembly 44 as evaluated by the exposure control network 46.

Typically, this type of shutter drive assembly 52 is provided with a spring, also not shown, for selectively springing the blades in their open condition. Since this mechanism does not form a part of the present invention, it has not been described in detail. Although not shown, an electronic strobe or flash arrangement may be operatively associated with the photographic apparatus. Such an arrangement can be of the type described in commonly-assigned U.S. Pat. No. 4,358,186.

For initiating the processing of each of the film units 12, there is provided processing means 54. Included in the processing means 54 is a pair of conventional processing rollers 56, 58; see FIG. 1. The rollers have been omitted from FIG. 2 for purposes of clarity. These rollers 56, 58 are suitably rotatably supported in the housing and are spaced apart for defining a predetermined gap therebetween. This gap facilitates formation of a desired processing fluid thickness on the film unit 12 in a known manner. The processing rollers 56, 58 are driven by a motor and gear train assembly (not shown). In this embodiment, the rollers 56, 58 are positioned adjacent the open end 20 of the container 18. When a film unit 12 is being extracted, a leading edge thereof passes into the nip of the rollers 56, 58. The rollers 56, 58 initially rupture the pods of the film units successively advanced therebetween. The rollers 56, 58 spread the processing fluid uniformly across the photosensitive image receiving area 12a as they drive the unit to the exposure/viewing station at the focal plane 40. In this connection, exposure should be commenced and terminated before the fluid completely reacts with the chemicals on the image receiving area 12a. This is, of course, needed in order to have the light rays react with the film to produce an image.

Referring back to the film handling mechanism 14, it is operated to advance the film unit 12 to the exposure/viewing station at the focal plane 40 while the primary apertures are closed. Of course, with a single lens system, the shutter blades 50 are driven to a closed orientation following commencement of an exposure cycle before the film unit reaches the focal plane 40. Exposure can commence once the film unit 12 has reached the focal plane. In this regard, a suitable delay switch in the camera control system (not shown) could cause deenergization of the solenoid for springing the shutter blades 50 to an open condition once the film unit is at the focal plane.

As described more fully in the last-noted application, the film handling mechanism 14 initially withdraws a film unit 12 from the container 18, advances it to the focal plane 40, whereat the unit 12 can be exposed and then returns it to the container. Since the film handling mechanism 14 is similar to that described in the last-noted application and since it does not, per se, form an aspect of the present invention, a detailed description thereof has been dispensed with. However, for purposes of better understanding this embodiment, a brief description thereof will be given. The mechanism 14 includes a pair of pick arms 60 extending from a film unit carrier assembly 62. The carrier assembly 62 is rotatably connected with a driving link 64 to a timing wheel 66. The film unit carrier 62 is mounted and guided for reciprocal movement along a path defined in part by the interior camera structure (not shown). The sequence of operations of the film carrier 62 for purposes of withdrawing the film unit, allowing exposure, and returning the film for subsequent reinsertion into the same container compartment is controlled by the timing wheel 66.

The present embodiment differs from that described in said last-noted application insofar as the timing wheel 66 completes a pair of revolutions before another exposure cycle is able to be commenced. One revolution would effect the operation of the film carrier 62 as noted in the last-noted application. The second revolution would be for the viewing mode. As will be explained, the timing wheel would again be actuated to withdraw the unit and advance it to the focal plane 40 for viewing purposes. After completion of viewing, the wheel would be actuated to return the film unit to the container 18. Operation of the viewing mode will be effected by a viewing mode assembly to be described.

It should be noted that the present invention also contemplates that the film unit 12 not return to the container for imbibition, but would remain at the focal plane 40 for viewing prior to returning to the container. Since the present invention allows spreading of the processing fluid prior to exposure, imbibition can take place at the focal plane 40 or exposure/viewing station. In this regard, instead of returning the unit 12 to the storage compartment following exposure, the control logic of the camera control system could delay reenergization of the timing motor until imbibition takes place at the exposure/viewing station. Of course, commencement of viewing as will be described would interrupt the signal to reenergize the timing motor for returning the unit to the container following termination of exposure. Thus, the unit 12 remains stationary and is able to be viewed at the same station without moving the same.

Reference is now made to the optical system 68 of the present embodiment. It is perhaps best shown in FIGS. 3 and 4. This optical system 68 provides a single lens reflex function to the camera and also permits the operator to view the processed transparency 12 at the focal plane 40.

The optical system 68, as diagrammatically shown, is basically known as Abbe's modification of a Porro-Prism system. In the present embodiment, however, mirrors are used instead of prisms. With this system 68, the images of the scene to be photographed can be viewed at the viewfinder lens 70 for aiming and framing purposes. Also, the images of the slide transparency 12 when projected back to the viewfinder lens 70 are inverted and reverted. In this manner a viewer can view the images of the transparency in a manner which corresponds to the scene just photographed. Since the optical system 68 is a well-known type, only a brief description thereof is set forth. Included in the optical system 68 is, of course, the objective lens system 32 and suitably spaced behind it is a Fresnel-type field lens 71 situated just behind the focal plane 40. A mirror 72 is arranged with respect to and spaced behind the taking lens 32 and the field lens 71 so as to direct the scene images upwardly to a second mirror 74. The second mirror 74 is positioned above the mirror 72 and appropriately spaced therefrom as well as positioned and spaced with respect to a third mirror 76. The second mirror directs its images to the third mirror 76 which, in turn, directs the images therefrom to a fourth mirror 77. From the fourth mirror 77 the images are directed to the viewfinder lens 70.

Figure 2:
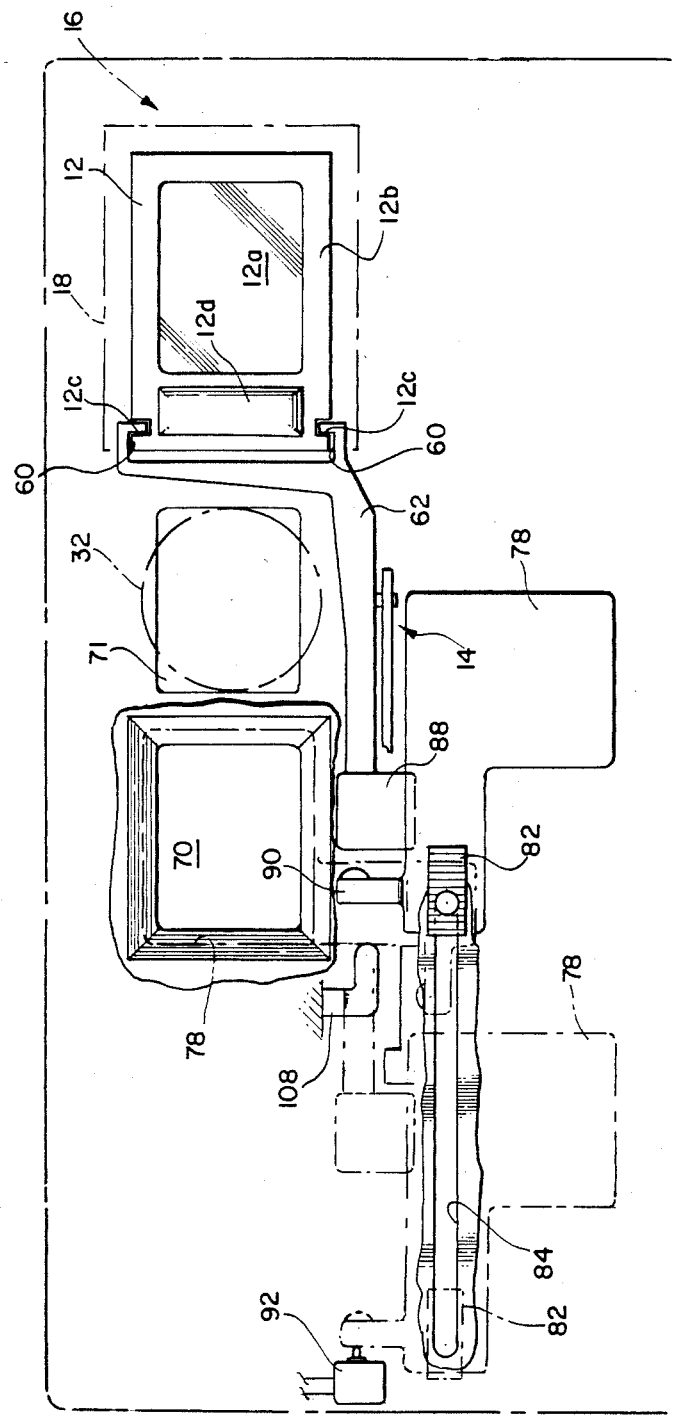
FIG. 2 is an enlarged diagrammatic rear view illustrating other components of the apparatus illustrated in FIG. 1.
Figure 4:
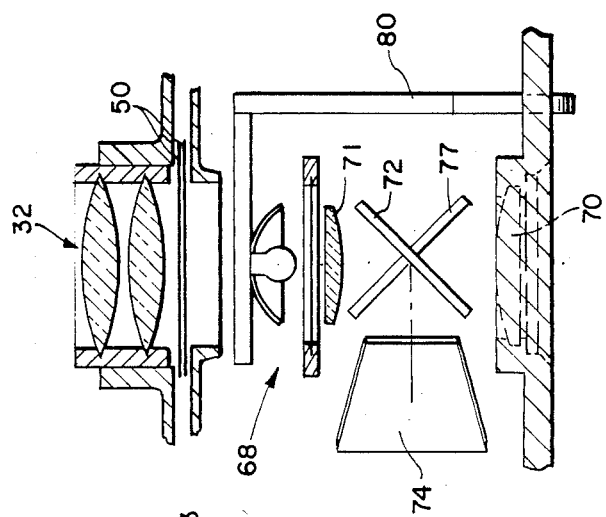

Continued reference is made to FIG. 2 for showing even more details of the present embodiment. For blocking scene light from reaching the film unit 12 from the viewfinder lens 70 during exposure there is provided a window blind assembly 78. The window blind 78 is pivotally mounted to a carrying member 80 (FIG. 3) suitably supported by structure not shown for longitudinal reciprocation. Normally, the window blind 78 is biased to its solid line horizontal position by a spring (not shown). For purposes of clarity the window blind 78 is not shown attached to the carrying member 80 in FIGS. 2-4. It should be appreciated that although the window blind is pivotal to the carrying member it also moves in unison therewith. The carrying member 80 is normally biased by spring 86 to the position as best shown in phantom lines in FIG. 3. The carrying member 80 has an external finger tab 82 extending outwardly from the rear of the camera body 24; see FIGS. 2-4. The tab 82 moves within a slot 84 which also defines the limits of movement of the carrying member 80. The window blind 78 is normally placed in a light unblocking position with respect to the viewfinder lens 70; see the solid line position in FIG. 2. When exposure is to take place, the window blind 78 is pivoted upwardly to the blocking position, see the vertical phantom line representation thereof in FIG. 2. This occurs after the film carrier 62 advances the film unit 12 from the container 18 to the focal plane 40. A projection 88 on the film carrier assembly 62 will contact a protruding offset arm 90 on the window blind 78 when the carrier assembly 62 is advancing the film unit 12 to the focal plane 40. Hence, the window blind 78 will pivot upwardly, against the bias of the window blind spring (not shown) from its generally horizontal unblocking position to its generally vertical blocking position. The window blind 78 will cooperate with a slot in a viewfinding tunnel (not shown). Accordingly, ambient light from the lens 70 cannot reach the film unit 12 during exposure. Once the film carrier 62 returns the unit 12 to the container 18 following exposure, the projection 88 no longer contacts the arm 90. Consequently, the spring-biased window blind 78 will be pivoted to its solid-line, horizontal position by the urging of such spring.

Figure 3:
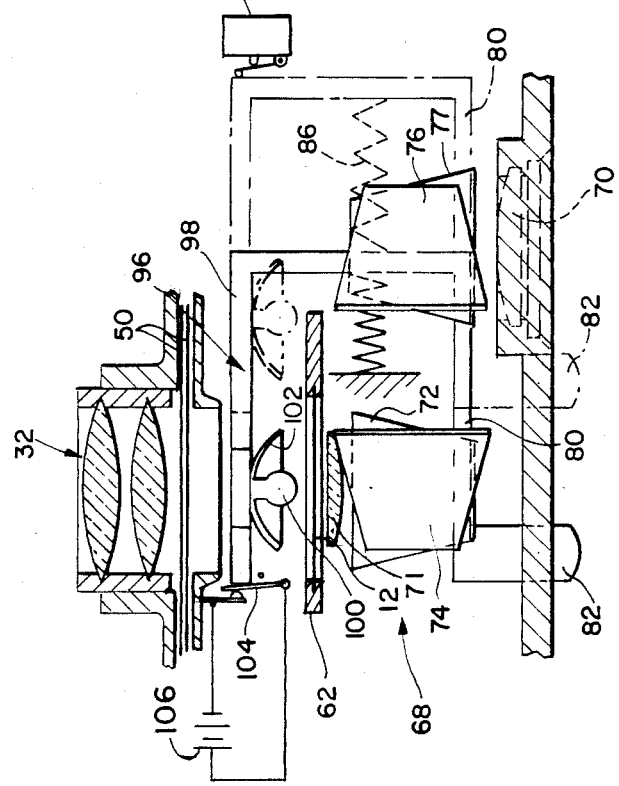
FIG. 3 is an enlarged diagrammatic planar view illustrating certain components of the embodiment shown in FIGS. 1 and 2; and, FIG. 4 is an enlarged diagrammatic end view showing the components of FIG. 3.

If the operator intends to view the transparency following exposure, the finger tab 82 and therefor the carrying member 80 are advanced leftwardly against the bias of the spring 86 such as best shown in solid lines in FIG. 3. It should be noted that the film unit 12 has been returned to the film container 18 for imbibition before the viewing mode. Hence, the unit 12 must be returned to the focal plane 40 for viewing purposes. In this embodiment, the indexing system 94 does not immediately index the container 18 following return of the unit for imbibition after a single revolution. Indexing is delayed by a suitable timeout delay in the camera control circuit which would allow the user time to determine whether or not he would like to view the transparency or proceed with another exposure. To effect viewing the carrying member 80 is advanced to its viewing mode position whereby the window blind 78 is in the horizontal phantom line position shown in FIG. 2. When so advanced, a microswitch 92 could be actuated by the offset 90 on the window blind 78. This would interrupt indexing of the film container 18 by the indexing system 94. As a result, the container 18 would not be indexed by the indexing system 94. The indexing system 94 is similar to the indexing system of the previously noted application. Hence, a detailed description thereof need not be given. The actuation of microswitch 92 would also cause the control circuit to initiate another rotation of the timing motor for initiating another revolution of the timing wheel 66. The control circuit would insure that the wheel 66, in the viewing mode, would rotate through a one-half revolution. Thus, the film unit 12 would be advanced back again to the focal plane 40 for viewing. To end the viewing mode, the user releases the tab 82. Accordingly, the spring 86 urges the carrying member 80 to its phantom line position shown in FIG. 3. Upon such return a microswitch 93 (FIG. 3) is tripped to effect actuation of the timing motor. Such effectuation is responsible for rotating the timing wheel 66 to allow it to complete its second revolution for returning the carrier 62 and the film unit 12 back to their starting positions. Also, the actuation of microswitch 93 allows the indexing system 94 to index the container 18 particularly since the microswitch 92 is no longer contacted. Thus, the timing wheel 66 would finish its second complete revolution during a given photographic cycle. After completion of the second revolution, of course, the unit 12 would return to the same container compartment. In the viewing mode it will be understood that the window blind 78 does not pivot upwardly since it has been moved laterally when the carrying member 80 has been moved to its viewing mode position.

Contemporaneously with movement of the carrying member 80 to the viewing mode position, an artificial illuminating means 96 is brought into operative arrangement with respect to the objective lens 32 and the film unit 12. In this regard, see FIG. 3. The illuminating means 96 includes an opaque arm 98 connected to and movable with the carrying member 80 in the manner shown in the drawings. The opaque arm 98 carries an energizeable light source or lamp 100 and a reflector 102. The opaque arm 98 when in its operative position is situated so that the light source 100 is positioned along the optical axis of the objective lens 32. As so positioned, the arm 98 blocks scene light from the objective lens from being passed through the transparency to the viewfinder lens 70. Advantageously, this prevents double images appearing at the viewfinder lens 70 when viewing. Stated somewhat differently, only the images of the positive transparency 12 will be visible at the viewfinder lens 70. This insures that a viewer views only the images of the film unit transparency. The lamp 100 is energized when the arm 98 reaches a position wherein switch contacts (not shown) on the arm, close normally open switch contacts 104 and energize the lamp 100 by the battery 106. The lamp 100 and the reflector 102 direct artificial illumination through the film unit transparency 12 to project the images thereon to the viewfinder lens 70 through the optical system 68. When the user releases the finger tab 82, the spring 86 drives the carrying member 80 from its solid line position, whereby the lamp 100 becomes deenergized. Also, the blocking arm 98 returns to its unblocking position. Hence, scene light is allowed to pass through the objective lens system 32 to the focal plane 40.

The present invention also contemplates an embodiment wherein imbibition takes place at the focal plane. Consequently, the film unit 12 need not return to the container prior to viewing. Rather, the film unit 12 can remain stationary. In such an arrangement, the timing wheel 66 would not immediately complete a single revolution following termination of exposure. In this regard a suitable time out delay in the camera control circuit would allow sufficient time to allow a user to determine whether or not he would effectuate a viewing mode. In this arrangement, unlike the previous one, the carrier member 60 is positioned so that the film unit is at the viewing station following exposure. Hence, projection 88 is still contacting the offset 90, thereby retaining the window blind 78 in its blocking vertical position. Since the window blind 78 would be in this vertical blocking position, the blind would have to be moved to the unblocking position. In such an embodiment, this is achieved by having a pivot abutment 108 positioned adjacent to the window blind 78; see FIG. 2. When the tab 82 and the carrying member 80 are moved leftwardly to their viewing mode position, the window blind 78 follows. The pivot abutment 108 contacts the offset 90 and causes the window blind 78 to pivot downwardly to the horizontal position. Thus, the viewfinder lens 70 is cleared for viewing. As with the previous arrangement, the illuminating means 96 would become contemporaneously operated. Actuation of a microswitch such as 92 of the last arrangement would be effective to have the control circuit interrupt rotation of the timing wheel following exposure.

After viewing the film unit, the user would release the carrying member 80 and under the influence of the spring 86, the carrying member returns to its normal position. During this return, a microswitch (such as 93) would be operated to commence rotation of the timing wheel for purposes of returning the exposed and viewed film unit to the container 18. The control circuit would then permit the indexing system 94 to index the container 18.

It is believed the operation of the foregoing apparatus and method have been made clear from the above description.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. A photographic apparatus for use in automatically exposing film units having a photosensitive area at a focal plane and for allowing processed ones of these units to be viewed at the same focal plane comprising:
    means for directing image forming light rays from a scene to be photographed to the focal plane;
    means for storing film units before and after exposure of the units;
    means operable for causing distribution of processing fluid over the photosensitive area of the film unit prior to viewing of the film unit;
    means for controlling passage of scene light to the focal plane for exposing the photosensitive area at the focal plane;
    optical means for optically permitting viewing of the scene images prior to exposure and for permitting viewing of the film units at the same focal plane following exposure; and,
    film handling means operable in response to initiation of a cycle for advancing an unexposed one of the stored units to the focal plane and for selectively exposing the unit at the focal plane, said film handling means including means being operable for presenting the film unit at the focal plane for viewing.

2. The apparatus of claim 1 wherein said handling means is operable to return the film unit to said storing means following exposure and said viewing means being operable for returning said unit from said storing means to the same focal plane for viewing.

3. The apparatus of claim 1 wherein said handling means is operable to maintain the film unit at the same focal plane following exposure and said viewing means is operable to permit viewing of the film unit at the same focal position prior to return of the film unit to said storing means, said handling means being operable to return the film unit to said storing means following viewing thereof.

4. The apparatus of claim 2 wherein said means for distributing the processing fluid over the photosensitive area is operable to do so prior to exposing of the film unit at said focal plane.

5. The apparatus of claim 4 wherein said processing means is operable upon advancement of the film unit from said storing means to the focal plane for causing distribution of processing fluid over the photosensitive area.

6. The apparatus of claim 5 wherein said optical means includes a viewfinding lens, and means cooperable with said viewfinding lens and said means for directing image forming light rays from a scene to the focal plane for providing a through-the-lens viewing system and capable of inverting and reverting images of the film unit at said viewfinder lens.

7. The apparatus of claim 6 wherein said means for permitting viewing of the unit includes a light blocking member which is movable to block scene light from the viewfinding lens reaching the film unit at the focal plane during exposure and is movable to unblock the viewfinding lens following exposure.

8. The apparatus of claim 7 wherein said means for permitting viewing of the unit includes means cooperable with said optical means and being operable for projecting artificial illumination at a processed and exposed ones of the film unit while at the focal plane so as to project images of the film unit to said viewfinding lens and for generally simultaneously blocking scene light from said means for directing scene light to said viewfinding lens during viewing of the film unit.

9. A camera for exposing, developing and viewing photographic film units, said camera comprising:
    means for directing scene light along a first given path to form an image at the camera focal plane;
    shutter means actuatable for blocking transmission of scene light along said first path;
    optical means for transmitting light along a second path from said focal plane for viewing an image of the scene;
    blocking means operable for blocking transmission of light back along said second path to said focal plane;
    storage means for storing a plurality of film units;
    film handling means operable for advancing a film unit between said storage means and said focal plane;

processing means operable for distributing a processing fluid across at least a predetermined area of a film unit;

illuminating means operable for illuminating a film unit located at said film plane;

an actuator operable in a first mode for automatically controlling said blocking means, said shutter means, said film handling means, and said processing means so as to block said first and second light paths, advance an unexposed film unit to said focal plane for exposure, distribute said fluid across said area of said film, expose said film unit, and then advance the now exposed film unit to said storage means, and in a second mode for automatically controlling said blocking means, said film handling means, and said illuminating means to automatically advance or retain an exposed and developed film unit to said focal plane, unblock said second path and illuminate the film unit at said focal plane to permit viewing thereof; and, actuatable means for selecting said first or second mode.

10. A camera for exposing, developing and viewing photographic film units, said camera comprising:

means for directing scene light along a first given path to form an image at the camera focal plane;

shutter means actuatable for blocking transmission of scene light along said first path;

optical means for transmitting light along a second path from said focal plane for viewing an image of the scene;

blocking means operable for blocking transmission of light back along said second path to said focal plane;

storage means for storing a plurality of both unexposed and exposed and developed film units;

film handling means operable for advancing a film unit between said storage means and said focal plane;

processing means for distributing a processing fluid across at least a predetermined area of a film unit responsive to advancement of an unexposed unit to said focal plane;

an actuator operable in a first mode for automatically controlling said blocking means, said shutter means, said film handling means, and said processing means to block said first and second light paths, to advance an unexposed film unit to said focal plane for exposure, to distribute said fluid across said area of said film unit, unblocking and again blocking said first light path to provide an exposure in said film unit, and then advance the now exposed film unit to said storage means, and in a second mode for unblocking said light path subsequent to said exposure, but prior to removal of the now exposed and developed film unit from the exposure plane so as to permit viewing of said film unit thereat; and, actuatable means for selecting said first or second mode.

11. A method of exposing and viewing a film unit at the focal plane;

advancing an unexposed film unit from a storage area to the focal plane;

distributing processing fluid on the film unit prior to exposure thereof;

exposing the film unit;

imbibing the film unit while at the focal plane;

viewing the film unit while at the focal plane; and, returning the film unit from the focal plane to a storage area.

* * * * *